Oct. 9, 1956

H. MORRISON 2,765,977

ELECTRIC VENTILATING FANS

Filed Oct. 13, 1954

INVENTOR
HACKLEY MORRISON

BY *Stone, Boyden & Mack*

ATTORNEYS

Oct. 9, 1956   H. MORRISON   2,765,977
ELECTRIC VENTILATING FANS
Filed Oct. 13, 1954   7 Sheets-Sheet 2

INVENTOR
HACKLEY MORRISON

BY *Stone, Boyden & Mack,*
ATTORNEYS

Oct. 9, 1956   H. MORRISON   2,765,977
ELECTRIC VENTILATING FANS
Filed Oct. 13, 1954   7 Sheets-Sheet 3

INVENTOR
HACKLEY MORRISON
BY Stone, Boyden & Mack,
ATTORNEYS

Oct. 9, 1956

H. MORRISON 2,765,977

ELECTRIC VENTILATING FANS

Filed Oct. 13, 1954

INVENTOR.
Hackley Morrison
BY
Stone, Boyden & Mack,
ATTORNEYS.

Oct. 9, 1956

H. MORRISON 2,765,977

ELECTRIC VENTILATING FANS

Filed Oct. 13, 1954

*INVENTOR.*
*Hackley Morrison.*
BY
*Stone, Boyden & Mack,*
ATTORNEYS.

Oct. 9, 1956  H. MORRISON  2,765,977
ELECTRIC VENTILATING FANS
Filed Oct. 13, 1954  7 Sheets-Sheet 7

INVENTOR.
Huckley Morrison
BY
Stone, Boyden & Mack,
ATTORNEYS.

United States Patent Office 2,765,977
Patented Oct. 9, 1956

2,765,977

ELECTRIC VENTILATING FANS

Hackley Morrison, Houston, Tex.

Application October 13, 1954, Serial No. 462,082

18 Claims. (Cl. 230—259)

This invention relates to fans, and more particularly to fans of the type mounted directly on the shaft of an electric motor. It is applicable both to fans enclosed in cabinets for installation in window openings, and to fans of the pedestal type designed for table or counter use.

In the operation of such fans, especially when mounted in window openings for ventilation purposes, it is highly desirable to provide means whereby they may be adjusted to various angular positions, in both horizontal and vertical planes. In its broader aspects, an object of the present invention is to provide improved means by which such fans may be readily and conveniently adjusted through relatively wide angles to vary the direction of the air stream, as desired.

Another object of the invention is to devise improved means for supporting a fan of this type by suspending it from a point adjacent the top wall of a cabinet, or from an arm carried by a pedestal, instead of mounting it on a base in the usual manner.

A further general object is to provide a finger tip control, operating either through the top wall of a cabinet, and accessible from the outside thereof or through the arm of a pedestal, and accessible from above, for adjusting the angular position of the fan, as above mentioned.

Instead of manually adjusting the fan in a horizontal plane, I may provide power means for continuously oscillating it, such means permitting the manual tilting of the fan in a vertical plane, to different angles, while oscillating. A specific object of the invention is to devise improved oscillating mechanism operated by a motor independent of the motor which drives the fan, and controlled by a separate switch. If it is not desired to oscillate the fan, it is possible, by properly manipulating this switch, to employ the oscillating motor to angularly adjust the fan in a horizontal plane.

Also, instead of manually adjusting the fan in a vertical plane, I may continuously oscillate it in such plane. Another specific object of the invention is to devise means by which the fan may be oscillated in a vertical plane by the same independent motor which oscillates it in a horizontal plane. A still further object is to provide means by which the fan may either be simultaneously oscillated in both planes by said motor, or may be selectively oscillated in either plane, as desired.

Still another general object of the invention is to provide fan supporting, adjusting and oscillating means of exceptionally simple construction, and which can be manufactured at relatively low cost.

In order that the invention may be readily understood, reference is had to the accompanying drawings forming part of this specification, and in which.

Referring to the drawings in detail, and more particularly first to Figs. 1 to 7 thereof, one form of my improved fan comprises a cabinet 1 having rigid end panels 2, a top 3 and wire mesh or expanded metal sides 4.

Figures 3, 4:
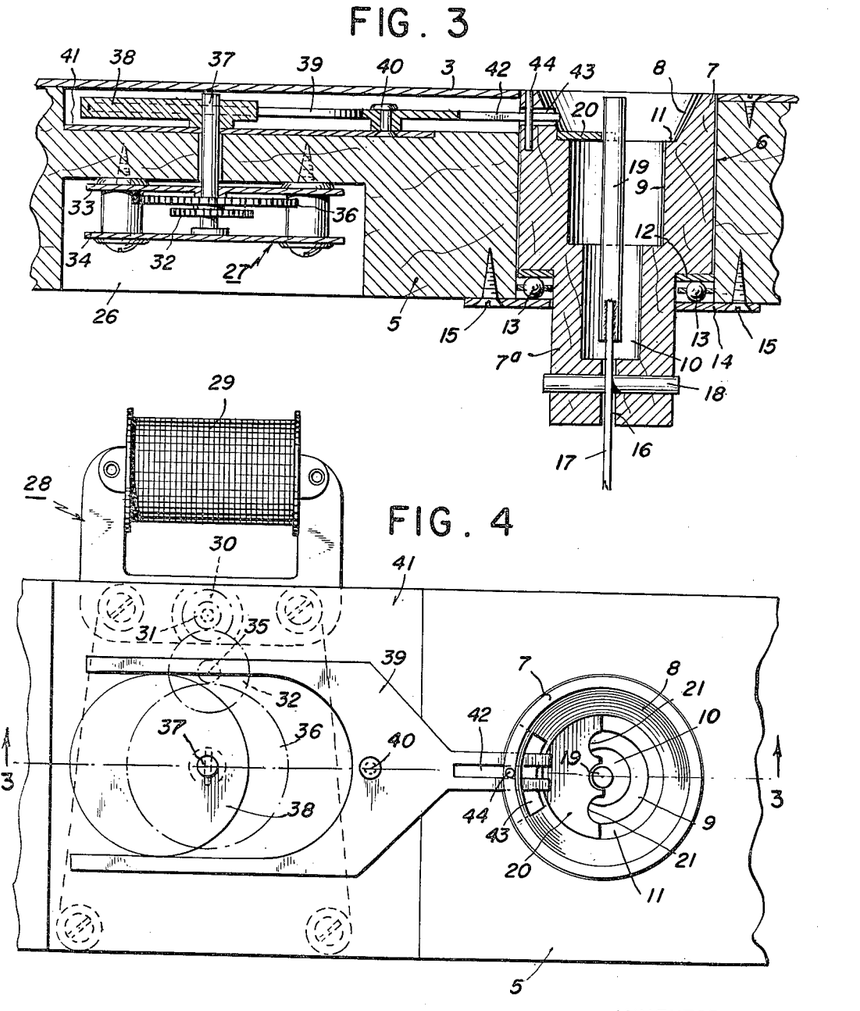
Fig. 3 is a fragmentary vertical section substantially on the line 3—3 of Fig. 4, looking in the direction of the arrows.
Fig. 4 is a fragmentary plan view on an enlarged scale of some of the parts shown in Fig. 2.
Figures 5, 6, 7:
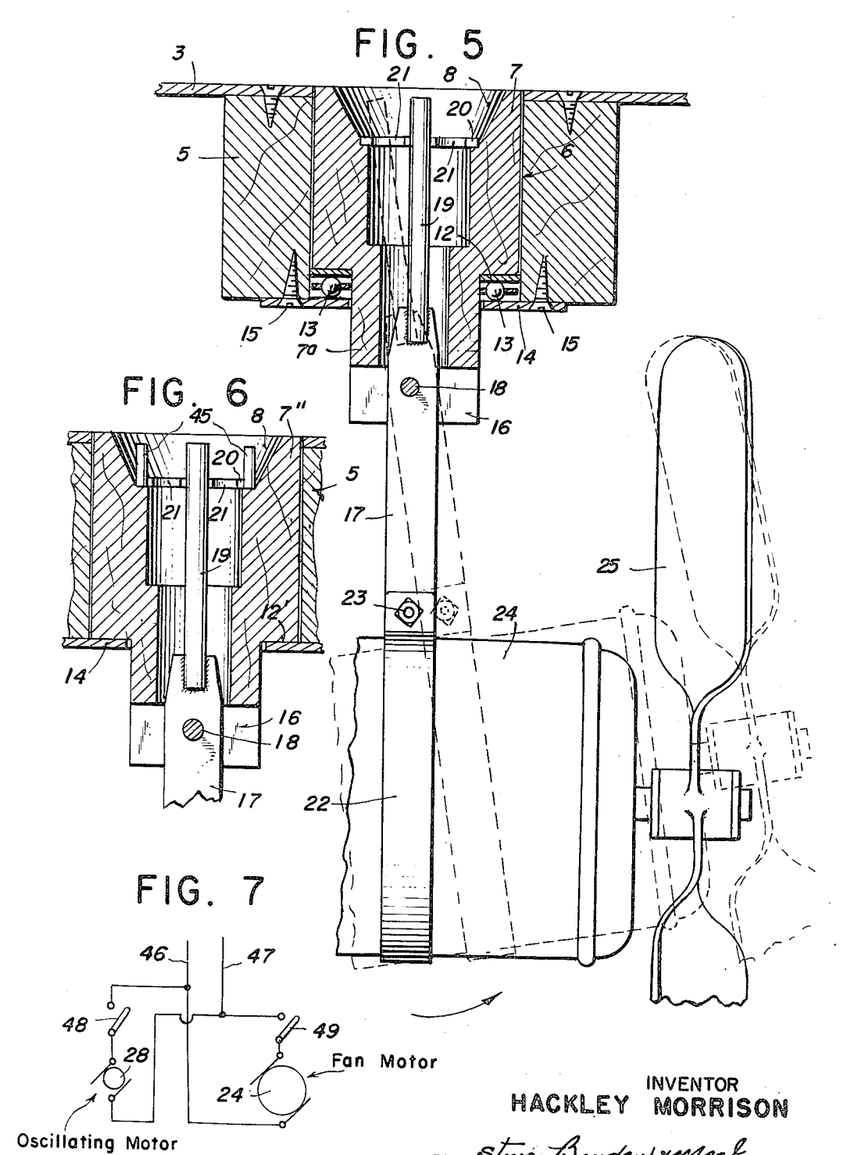
Fig. 5 is a vertical section on an enlarged scale substantially on the line 5—5 of Fig. 2, looking in the direction of the arrows.
Fig. 6 is a fragmentary sectional view similar to the upper part of Fig. 5, but showing a slightly modified construction.
Fig. 7 is a diagram showing the electrical circuits which I employ.

Across the upper part of the cabinet adjacent the top extends a supporting bar or beam 5, which may be of wood, carried by the end panels 2, and the top 3 is secured to this beam, as shown in Figs. 3 and 5.

A circular opening 6 extends vertically through the top 3 and beam 5, and in this opening a cylindrical member 7 is mounted for rotation about a vertical axis. This member 7 is more or less hollow, having at its upper end a bevelled depression 8 and beneath this depression a pair of circular chambers 9 and 10. The upper end of the member 7 preferably terminates flush with the surface of the top 3, and between the depression 8 and chamber 9 is a horizontal annular shoulder 11. This member 7 may consist of a wooden block, or may be molded from plastic or other suitable material.

The lower end 7a of the member 7 is of smaller diameter than the upper portion and extends freely down through an opening in a plate 14 secured to the lower side of the beam 5 as by screws 15, and an anti-friction thrust bearing is provided between the shoulder at the lower end of the upper portion of the member 7 and the supporting plate 14, such anti-friction bearing comprising an annular race way 12 and a series of balls 13. From this it will be seen that the entire member 7 rests upon the ball bearing 13 supported on the plate 14.

A slot 16 extends transversely across the lower end of the portion 7a just below the chamber 10 and passing freely through this slot is a metal strap or strip 17 supported on a pivot pin 18 extending transversely through the portion 7a, as clearly shown in Figs. 3 and 5.

Welded or otherwise rigidly secured to the upper end of the strap or strip 17 is a rod 19 which extends up through the chambers 10 and 9 and into the depression 8. A semi-circular plate 20 is supported on the annular shoulder 11 and is provided at its edge with a plurality of notches 21, as best shown in Fig. 4. The rod 19 is adapted to engage in any desired one of these notches, and the resilience of the strap 17 enables the rod to be deflected laterally so that it may be moved from one notch to another, and this resilience also tends to hold the rod in any notch to which it may be moved.

The lower end of the strap or strip 17 is formed into a loop 22, as shown in Fig. 5, and is adapted to encircle an electric motor 24 carrying a fan 25. The ends of the loop are secured by a bolt 23 and by tightening this bolt the loop is caused to firmly grip the motor.

From the foregoing it will be understood that the parts 17 and 19 constitute a hanger by means of which the fan and motor unit is suspended from the member 7, and it will be understood that by moving the rod 19 into engagement with a different one of the notches 21 the hanger may be swung in a vertical plane so that the fan may be adjusted to different angular positions as indicated in full and dotted lines in Fig. 5. In this way the air stream from the fan may be directed horizontally or upwardly or downwardly as desired.

Within a recess 26 formed in the under side of the beam 5 is mounted clock work 27 operatively connected with a relatively small independent electric motor 28. As shown, this motor comprises a field coil 29 and an armature 30. On this armature is mounted a pinion 31 which meshes with a gear 32. Rigid with the gear 32 is a pinion 35 meshing with a gear 36, all of these gears and pinions being mounted between a pair of spaced plates 33 and 34, as is common in clock work gear trains.

The final drive shaft 37 of this clock work extends up through the beam 5 into a recess at the upper surface thereof, as clearly shown in Fig. 3. The purpose of the gear train is, of course, to reduce the speed of the final drive shaft 37 to the desired extent. It will, of course, be understood that the particular gear train 27 and motor 28 shown and described are illustrative only and that any other desired arrangement of motor and speed reducing gearing may be employed.

Secured to the upper end of the drive shaft 37 is an eccentric 38, and a yoke 39 is arranged to embrace this eccentric as shown in Fig. 4. This yoke is pivotally mounted on a pin 40 carried by a plate 41, and, at its opposite end is formed with a fork 42 adapted to embrace a pin 44 set into the upper end of the member 7, this member being cut away as shown at 43 so as to provide a space within which the fork may operate.

From the foregoing it will be understood that when the motor 28 runs, the eccentric 38 will operate to swing the yoke 39 from side to side on its pivot 40 thus causing the fork 42 by means of the pin 44 to oscillate the member 7 about its vertical axis and thus to oscillate the fan and motor unit 24, 25 in a horizontal plane. As long as the motor 28 runs the fan will be continuously oscillated.

It will be noted that this oscillation of the fan is entirely independent of the fan motor and is also independent of the position to which the rod 19 may be adjusted. In other words, the fan and motor unit may be set to any desired angle in a vertical plane by means of the rod 19 and will be oscillated in a horizontal plane while in any angle to which it may be set.

While I have shown and described an eccentric and yoke for oscillating the member 7 it will be understood that any other suitable mechanism by which the motor 28 may oscillate this member can be used if desired.

Figure 1:
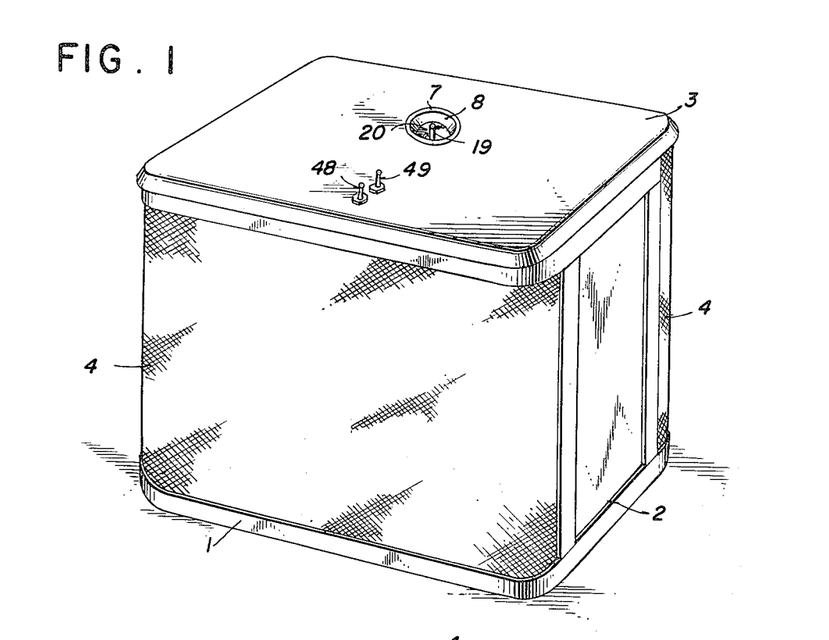
Fig. 1 is a perspective view of one embodiment of the invention in which the fan is mounted in a cabinet.
Figure 2:
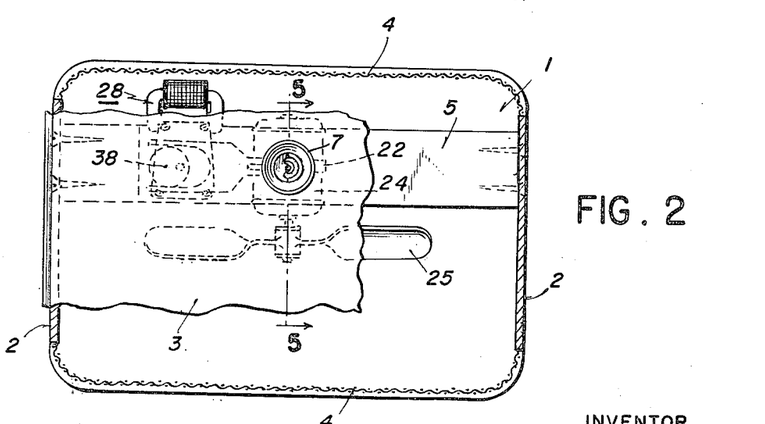
Fig. 2 is a plan view of the cabinet shown in Fig. 1, parts being broken away and parts being in section.

The motors 24 and 28 are controlled by separate switches 48 and 49, preferably mounted on the top of the cabinet as shown in Fig. 1. By reference to Fig. 7, it will be seen that the two motors are connected in parallel across the supply line 46, 47 and that these motors are in independent circuits controlled by the switches 48 and 49, respectively.

While I have described the motor 28 as serving to continuously oscillate the fan in an horizontal plane it is obvious that if it is not desired to oscillate the fan, the motor 28 may be stopped by opening the switch 48. It will also be understood that by momentarily closing this switch, the motor 28 will serve to move the fan unit to different angular positions in an horizontal plane. Thus I have provided manual means for angularly adjusting the fan unit in a vertical plane, and power operated means for angularly adjusting it in an horizontal plane.

If it is desired to embody the principles of the invention in less expensive apparatus not employing an auxiliary motor such as 28 to oscillate the fan, I may employ the construction shown in Fig. 6. By reference to this figure it will be seen that the ball bearings 13 are omitted and that the shoulder 12' on the member 7" rests directly on the plate 14. In this modification I provide a pair of upstanding pins 45 or the like, secured in position as by being welded to the plate 20, which pins may be grasped by the fingers in order to turn the member 7" about a vertical axis and thus adjust the fan unit in an horizontal plane to different angular positions. In this arrangement, the friction between the shoulder 12' and the supporting plate 14 will be sufficient to maintain the fan unit in any angular position to which it may be adjusted.

The upper end of the rod 19 and also the pins 45 preferably lie wholly within the recess 8 and do not extend above the plane of the top 3, so that this top is flat and smooth throughout, with the possible exception of the switches 48 and 49. It will be seen that by means of the rod 19 in both modifications, and of the pins 45 in the modification of Fig. 6, I have provided a finger tip control, accessible from outside the cabinet, for angularly adjusting the position of the fan unit as desired.

Figures 8, 9, 19, 20:
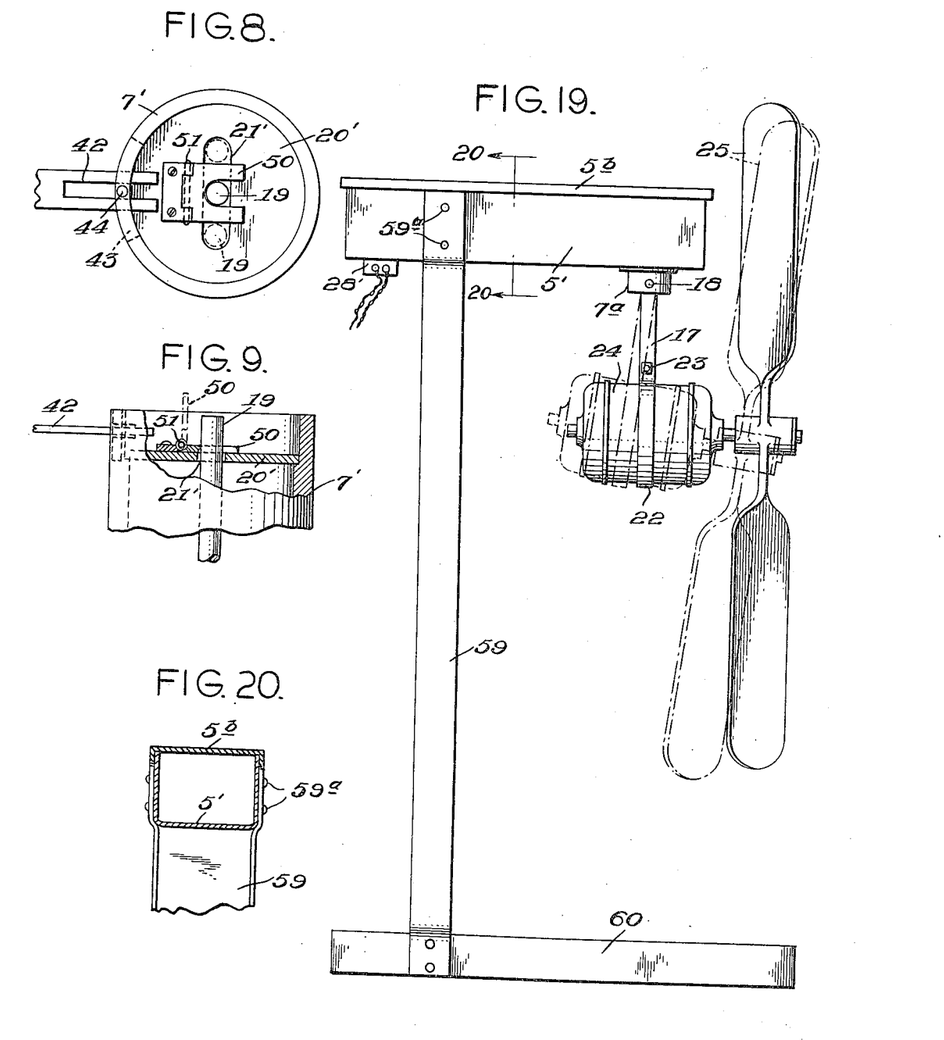
Fig. 8 is a plan view of a modified arrangement for retaining the hanger in different angular positions.
Fig. 9 is a fragmentary side elevation thereof, parts being broken away, and parts being in section.
Fig. 19 is a side elevation showing how the invention can be embodied in a pedestal-type fan.
Fig. 20 is a vertical, transverse section on the line 20—20 of Fig. 19, looking in the direction of the arrows.
Figure 10:
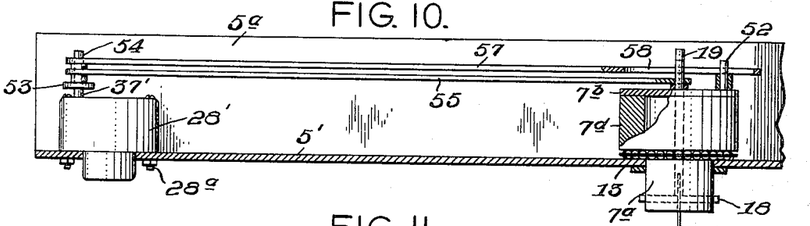
Fig. 10 is a vertical sectional elevation of one form of the means for oscillating the fan in both vertical and horizontal planes, simultaneously, a modified type of auxiliary motor being shown.

In Figs. 8 and 9 I have shown a modified construction of means for holding or locking the fan in different angular positions in a vertical plane. In the hollow member 7' is set a plate 20' having a slot 21' through which the rod 19 extends. A hinge member 50 is pivotally mounted at 51 on the plate 20' so that it may occupy either of the positions shown in full and dotted lines in Fig. 9. This hinge member has a notch extending inwardly from its free edge so as to form a fork, this notch being of such size as to receive the rod 19 as clearly shown in Fig. 8. When the hinge member is in its full line position, with the rod 19 positioned in the notch it will be clear that the rod is locked in its intermediate position in which the fan delivers its air stream in a substantial horizontal direction. When, however, it is desired to tilt the fan up or down, the hinge member 50 is swung up to dotted line position, the rod 19 shifted to one side or the other, as indicated in dotted lines in Fig. 8, and the member 50 then lowered, thus locking the rod between such member and the end of the slot 21'.

In Figs. 10 to 14 inclusive, I have illustrated one form of my improved arrangement for continuously oscillating the fan in both a horizontal and a vertical plane at the same time. In this figure I have illustrated a fixed support 5' in the nature of a channel member having flanges 5a, as distinguished from the wooden member 5 shown in Figs. 2 and 3. The rotatable hollow member is shown at 7d as provided with a top or cover 7b having a slot 7c formed therein. The tilt rod 19 extends up through this slot.

In these figures also I have shown a modified form of auxiliary motor 28', illustrated as of circular shape and secured to the bottom of the channel 5' as by means of bolts 28a. This motor has a final drive shaft 37' on which is mounted a crank arm 53 having at its end a crank pin 54.

Figure 11:
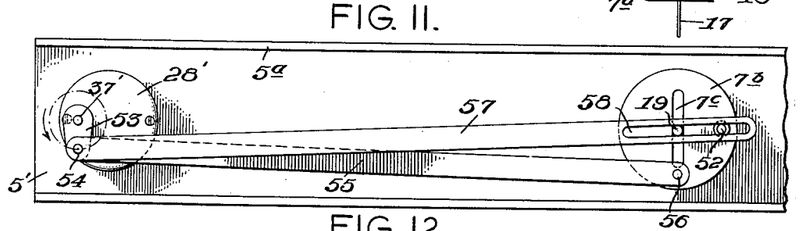
Figs. 11 to 14 inclusive are a series of plan views of the mechanism illustrated in Fig. 10, each of these four views showing the parts in a different position.

Two separate links 55 and 57 are connected at one end with this crank pin, as clearly shown in Fig. 11. The other end of the link 55 is connected to the hollow member 7d by means of a pivot pin 56. The other end of the link 57 is formed with an elongated slot 58 which freely engages over a pin 52, likewise carried by the hollow member 7d and also freely engages the rod 19.

Fig. 11 illustrates the position of the parts when the crank arm 53 extends at right angles to the channel member. In this position the rod 19 is at the center of the slot 7c thus holding the fan in horizontal position.

Figure 12:
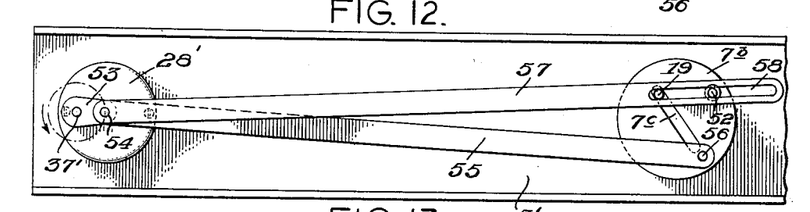

Fig. 12 illustrates the position of the parts when the crank arm 53 has turned through 90 degrees and extends parallel with the channel member. The pin 56 has now been shifted toward the right from its position shown in Fig. 11, with the result that the hollow member has been turned through a considerable angle, thus swinging the fan in a horizontal plane. At the same time the pin 52 has been shifted upwardly and the link 57, cooperating with this pin and the rod 19, has shifted the latter to the upper end of the slot 7c thus tilting the fan upwardly or downwardly.

Figure 13:
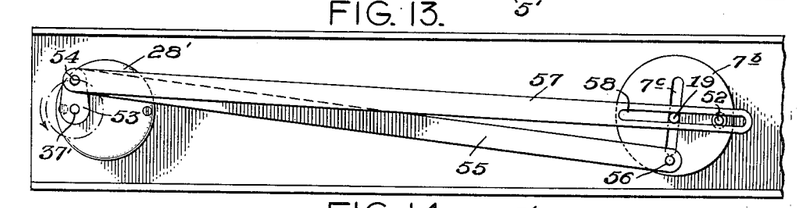
Figure 14:
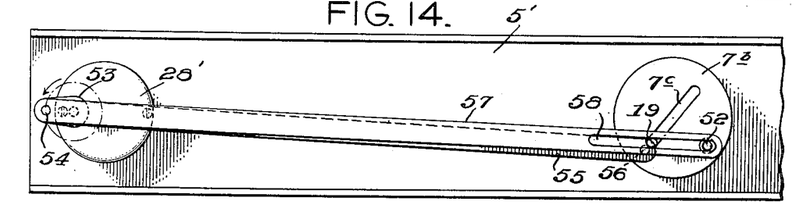
Figure 15:
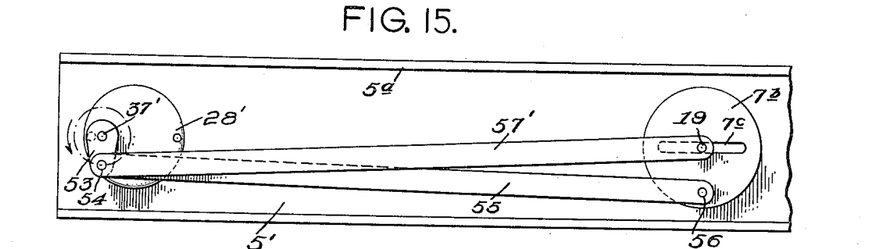
Figs. 15 to 18 inclusive are a series of plan views illustrating a modified construction of mechanism for oscillating the fan in both vertical and horizontal planes simultaneously, each of these four views showing the parts in a different position.
Figure 16:
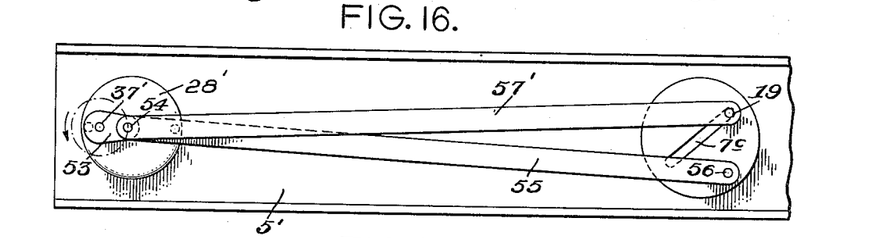
Figure 17:
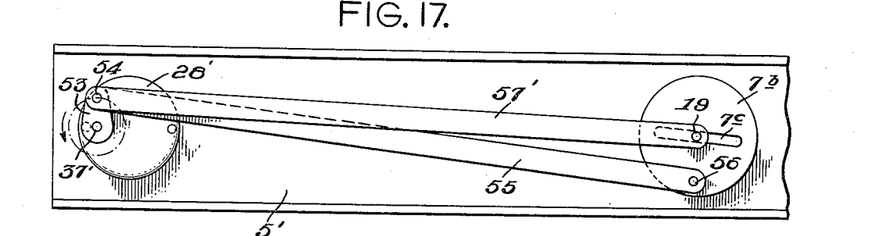
Figure 18:
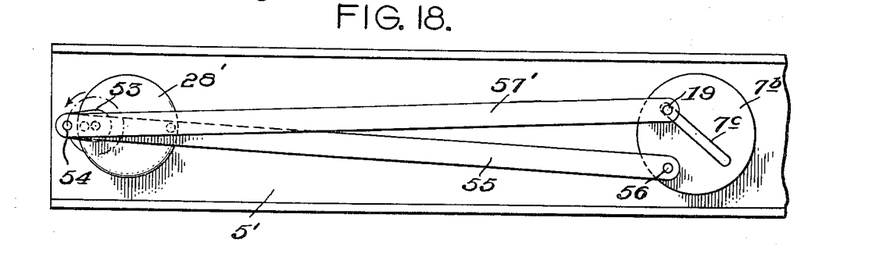

Fig. 13 illustrates the position of the parts after the crank arm 53 has moved 90 degrees further. Here the parts resume almost the same positions which they occupied in Fig. 11. Finally Fig. 14 illustrates the position of the parts when the crank arm has turned still another 90 degrees. In this position the pin 56 has been moved to the left thus swinging the hollow member and the fan horizontally in a direction opposite to that in which they were moved in Figs. 11 and 12, while at the same time the pin 52 has moved downwardly thus bringing the rod 19 to the opposite end of the slot 7c and thereby tilting the fan in a direction opposite to that shown in Fig. 12.

From the foregoing it will be seen that as the drive shaft 37' of the motor 28' rotates, the hollow member 7d and with it the fan, will be oscillated in a horizontal plane, and at the same time the rod 19 will be swung back and forth thus oscillating the fan in a vertical plane.

In Figs. 15 to 18 I have shown a modified arrangement for producing the same result. In these figures the same reference characters indicate similar parts. The link 57' instead of having a slot as in the previous figures, is pivoted directly on the rod 19. Otherwise the construction is the same. As the crank 53 rotates the hollow member is oscillated by the link 55 as before, thus swinging the fan in a horizontal plane, at the same time progressively changing the angle of the slot 7c. Meanwhile, the link 57' pulls the rod 19 back and forth along this slot, from one end to the other thereof. This, of course, results in tilting the fan up and down in a vertical plane, while it is being oscillated in a horizontal plane.

While in Figs. 1 to 5, I have illustrated the hollow member and fan as mounted inside of a cabinet and supported from a point near the top thereof, I have shown in Fig. 19 how the invention can be adapted to a pedestal type fan. In this figure I have shown a fixed support in the form of a channel member 5' such as is illustrated in Figs. 10 to 18, provided with a cover 5b. This channel member is shown as supported on a column 59 to which it may be secured as by bolts or rivets 59a. The column 59 is secured at its lower end to a base or pedestal 60 adapted to be supported on a table or the like. The auxiliary motor is indicated at 28' and the mechanism inside of the channel member may be similar to that shown in Figs. 10 to 18. The operation of this mechanism on the rod 19 results in tilting the fan back and forth as shown in full and dotted lines. If it is not desired to oscillate the fan continuously, in a vertical plane, then the rod 19 may be extended up through the cover 5b so as to be manually adjustable as shown in Fig. 1.

Finally, in Figs. 21 to 24, inclusive, I have illustrated an arrangement by which the fan may be selectively oscillated in either a horizontal or a vertical plane, or both, as desired. In these figures the same reference characters used in the previous figures designate similar parts.

The mechanism is illustrated as carried by a somewhat modified form of channel 5", which constitutes a fixed support.

Figure 21:
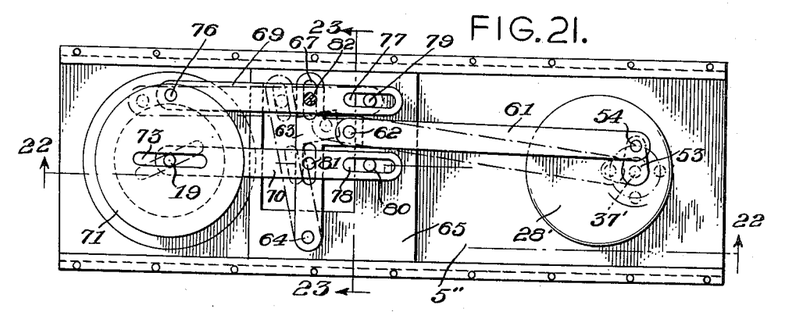
Fig. 21 is a plan view on a somewhat larger scale of a construction of mechanism by which the fan may be oscillated selectively in either a vertical or a horizontal plane, or both, as desired, the cover being omitted.
Figures 22, 23:
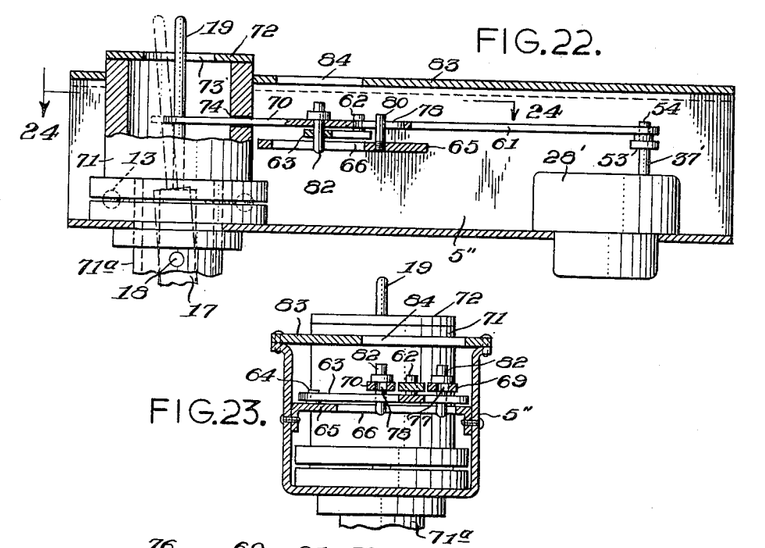
Fig. 22 is a vertical, longitudinal section substantially on the line 22—22 of Fig. 21, looking in the direction of the arrows, parts being in elevation.
Fig. 23 is a transverse section, substantially on the line 23—23 of Fig. 21, looking in the direction of the arrows.

Instead of the two links shown in Figs. 10 to 18, inclusive, there is shown in Figs. 21 to 24 only a single link 61 connected to the crank pin 54 of the auxiliary motor. The other end of this link is pivotally connected at 62 to a lever 63 pivotally mounted at 64 on a supporting platform 65 secured to the sides of the channel member as shown in Fig. 23. This platform is cut away to form an opening 66 as shown.

Figure 24:
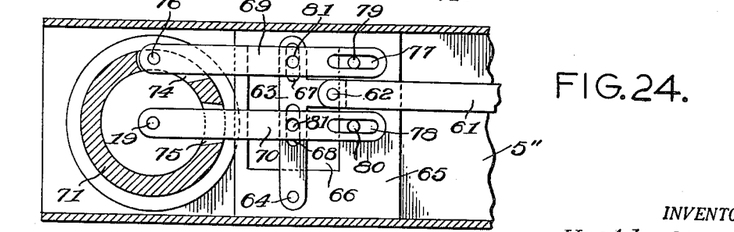
Fig. 24 is a fragmentary horizontal section substantially on the line 24—24 of Fig. 22, looking in the direction of the arrows.

The lever 63 has formed therein at longitudinally spaced points a pair of slots 67 and 68 for a purpose hereinafter explained. A pair of longitudinally slidable links 69 and 70 are provided. The link 69 is connected by a pivot pin 76 to one side of the hollow member 71, while the link 70 is connected directly to the rod 19. The links 69 and 70 preferably extend through openings 74 and 75 in the wall of the hollow member 71, as best shown in Fig. 24, so that they engage the hollow member and the rod 19 at points below the top of the channel.

The hollow member 71 is provided with a top or cover 72 having a slot 73 therein, through which slot the rod 19 freely passes.

The free ends of the links 69 and 70 are formed with slots 77 and 78 working freely over guide pins 79 and 80 set in the platform 65.

The links 69 and 70 also have formed therein holes 81 which register with the slots 67 and 68 in the lever 63, the links overlying this lever as clearly shown in the drawings. Pins 82 are provided, which pins may be inserted through an opening 84 in the cover 83 of the channel into the holes 81 and down through the slots 67 and 68 in the lever 63.

From the foregoing it will be understood that as the crank arm 53 revolves the link 61 is reciprocated and this in turn oscillates the lever 63 on its pivot. If neither of the pins 82 is inserted in the holes 81 the lever oscillates idly, having no effect on the hollow member or fan. If, however, a pin 82 is inserted in the hole 81 of link 69 as shown in Fig. 21, this link will be coupled to the lever 63, and as the lever 63 swings on its pivot, the hollow member 71 will be oscillated in a horizontal plane. If on the other hand a pin 82 is inserted in the hole 81 of link 70, then this link will be coupled to the lever 63 and will reciprocate as the lever swings. Reciprocation of the link 70 will obviously tilt the rod 19 back and forth thus causing the fan to oscillate in a vertical plane.

If pins 82 are placed in the holes 81 of both links 69 and 70, then the hollow member and fan will be oscillated in a horizontal plane while at the same time the rod 19 will oscillate the fan in a vertical plane.

The mechanism above described for selectively oscillating the fan in either a horizontal or vertical plane or both as desired is illustrative only, and I do not intend to be limited to the exact details shown, as many other mechanical arrangements for producing this result will readily suggest themselves to those skilled in the art.

What I claim is:

1. The combination with a fixed horizontal support, of an upwardly opening hollow member mounted thereon for rotation about a vertical axis, a hanger pivotally mounted within the lower end of said member to swing in a vertical plane, a fan and motor carried by said hanger, and means at the upper end of said hollow member for moving said hanger to and holding it in any one of a plurality of angular positions.

2. The combination with a fixed horizontal support, of an upwardly opening hollow member mounted thereon for rotation about a vertical axis a hanger pivotally mounted within said member to swing in a vertical plane, a fan and motor carried by said hanger, means connected with said hollow member for turning said member, and means extending to the top of said member for moving said hanger on its pivot to different angular positions.

3. The combination with a cabinet having a top wall provided with an opening, of a motor and fan unit housed therein, and means for supporting and universally adjusting said unit, said means comprising a supporting member mounted adjacent said opening in the top wall of said cabinet for rotation in a horizontal plane, and a hanger carrying said unit and pivotally mounted on said supporting member to swing in a vertical plane, the upper end of said hanger being accessible through said opening.

4. The comination with a cabinet having a top wall, of a motor and fan unit housed therein, means for supporting said unit wholly by suspending it from a point adjacent the top wall of the cabinet, an independent motor and means within the cabinet and controlled from outside the cabinet for swinging said unit in a horizontal plane.

5. The combination with a cabinet having a top wall, of a motor and fan unit housed therein, means for suspending said unit from a point adjacent the top wall of the cabinet, said top wall having an opening, means accessible through said opening by which said unit may be swung in a horizontal plane and means also accessible through said opening by which said unit may be swung in a vertical plane.

6. The combination with a cabinet having a top wall, provided with an opening, of a downwardly extending hollow member rotatably supported in said opening, means by which said member may be rotated, a notched plate extending transversely across the upper end of said hollow member at one side, a hanger pivotally mounted in said member to swing in a vertical plane and a fan and motor unit carried by said hanger, said hanger including a rod extending up through said hollow member to a point above said plate, said rod being constructed to engage in the notches of said plate to retain said hanger in any angular position to which it may be swung.

7. The combination with a cabinet having a top wall provided with an opening, of a downwardly extending hollow member rotatably supported in said opening, means secured to said hollow member and accessible through said opening by which said member may be rotated, a hanger pivotally mounted in said hollow member to swing in a vertical plane, a fan and motor unit carried by said hanger, and said hanger including a rod extending up through said hollow member into said opening, whereby said hanger may be swung as desired.

8. The combination with a cabinet having a top wall provided with an opening, of a downwardly extending hollow member rotatably supported in said opening, means secured to said hollow member and accessible through said opening by which said member may be rotated, a hanger pivotally mounted in said hollow member to swing in a vertical plane, a fan and motor unit carried by said hanger, and said hanger including a rod extending up through said hollow member into said opening, whereby said hanger may be swung as desired, and means co-operating with said rod to retain said hanger in any angular position to which it may be swung.

9. The combination with a cabinet having a top wall provided with an opening, of a motor and fan unit housed therein, downwardly extending supporting means mounted adjacent said opening in the top wall of said cabinet, and a hanger carrying said unit and pivotally mounted on said supporting means to swing in a vertical plane, the upper end of said hanger being accessible through said opening.

10. The combination with a cabinet having a top wall provided with an opening, of a motor and fan unit housed therein, downwardly extending supporting means mounted adjacent said opening in the top wall of said cabinet, a hanger carrying said unit and pivotally mounted on said supporting means to swing in a vertical plane, a part of said hanger extending up into said opening, whereby said hanger may be manually swung as desired, and means co-operating with said part to retain the hanger in any angular position to which it may be swung.

11. The combination with a supporting member, of a hanger pivotally mounted therein to swing in a vertical plane, a fan and motor unit carried by said hanger, said hanger having a part extending up through said supporting member, whereby said hanger may be swung as desired, and means for retaining said hanger in any definite angular position to which it may be swung, said means comprising a plate pivoted about a horizontal axis on said supporting member and constructed to engage and lock the above mentioned part of said hanger.

12. The combination with a fixed, horizontal support, of a motor and fan unit disposed beneath and suspended from said support, and electrically operated means independent of said motor and mounted on said support for swinging said unit in a horizontal plane.

13. The combination with a cabinet having a top wall, of a motor and fan unit housed therein, means for suspending said unit from a point adjacent the top wall of the cabinet, manual means extending up through the top wall of the cabinet for adjusting said unit in a vertical plane to different angular positions, and an independent motor within said cabinet for adjusting said unit in a horizontal plane to different angular positions.

14. The combination with a fixed, horizontal support, of a member mounted thereon for rotation about a vertical axis, a motor and fan unit suspended from said member beneath said support, an independent motor mounted on said support and spaced laterally a substantial distance from said member, and means interconnecting said independent motor and member and operated by said independent motor for oscillating said member and unit about said vertical axis.

15. The combination with a support, of a motor and fan unit mounted on said support, a single auxiliary independent motor also carried by said support, and means interconnecting said independent motor and motor and fan unit, and operated by said independent motor for continuously oscillating said motor and fan unit in a horizontal plane, said means including means for causing said motor and fan unit to oscillate at the same time in a vertical plane.

16. The combination with a support, of a motor and fan unit mounted on said support, an auxiliary independent rotary motor also carried by said support, and means also mounted on said support operated by said independent motor for oscillating said motor and fan unit in both vertical and horizontal planes, said means including means by which one or the other of said planes may be selected, as desired.

17. The combination with a fixed, horizontal support, of a movable supporting member carried thereby, thrust bearings on which said member is mounted to rotate about a vertical axis, a motor and fan unit, means suspending said unit from said supporting member, said suspending means including a horizontal pivot located between said unit and said thrust bearings, so that said unit may swing in a vertical plane, an independent motor mounted on said fixed support, and means operatively associated with said independent motor and said member for oscillating said member and unit about said vertical axis.

18. The combination with a fixed horizontal support, of a movable supporting member mounted thereon to swing about a vertical axis, a hanger depending from said member, a motor and fan unit suspended from said member by means of said hanger and including a horizontal pivot means about which said unit may swing in a vertical plane, said pivot means being carried by said hanger at a point between said unit and said fixed support, an independent motor mounted on said fixed support, and means operatively associated with said independent motor and said member for oscillating said member and unit about said vertical axis.

References Cited in the file of this patent

UNITED STATES PATENTS

| | | |
|---|---|---|
| 1,125,684 | Greenberg et al. | Jan. 19, 1915 |
| 1,246,967 | McEwen | Nov. 20, 1917 |
| 1,248,437 | Barducci | Dec. 4, 1917 |
| 1,334,958 | McEwen | Mar. 30, 1920 |
| 1,558,912 | Ordakowsky | Oct. 27, 1925 |
| 2,084,744 | Rathbun | June 22, 1937 |
| 2,261,391 | Koch | Nov. 4, 1941 |
| 2,300,723 | Berry | Nov. 3, 1942 |
| 2,476,692 | Bernstein | July 19, 1949 |
| 2,613,109 | Walker | Oct. 7, 1952 |
| 2,618,434 | Farnsworth | Nov. 18, 1952 |
| 2,635,920 | Boyce | Apr. 21, 1953 |